(12) United States Patent
Lee et al.

(10) Patent No.: US 10,862,572 B2
(45) Date of Patent: Dec. 8, 2020

(54) METHOD AND DEVICE FOR RECEIVING SYSTEM INFORMATION VIA BEAM

(71) Applicant: LG ELECTRONICS INC., Seoul (KR)

(72) Inventors: Youngdae Lee, Seoul (KR); Hanbyul Seo, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 7 days.

(21) Appl. No.: 16/318,690

(22) PCT Filed: Jul. 14, 2017

(86) PCT No.: PCT/KR2017/007541
§ 371 (c)(1),
(2) Date: Jan. 17, 2019

(87) PCT Pub. No.: WO2018/016800
PCT Pub. Date: Jan. 25, 2018

(65) Prior Publication Data
US 2019/0222293 A1    Jul. 18, 2019

Related U.S. Application Data

(60) Provisional application No. 62/364,824, filed on Jul. 20, 2016.

(51) Int. Cl.
*H04B 7/08* (2006.01)
*H04W 48/08* (2009.01)
(Continued)

(52) U.S. Cl.
CPC ........... *H04B 7/088* (2013.01); *H04B 7/0413* (2013.01); *H04B 7/0686* (2013.01);
(Continued)

(58) Field of Classification Search
None
See application file for complete search history.

(56) References Cited

U.S. PATENT DOCUMENTS 9,913,265 B2 * 3/2018 Guan .................... H04L 45/02
2009/0262693 A1   10/2009 Wang et al.
(Continued)

FOREIGN PATENT DOCUMENTS

WO        2016086144        6/2016

OTHER PUBLICATIONS

PCT International Application No. PCT/KR2017/007541, International Search Report dated Oct. 20, 2017, 4 pages.

*Primary Examiner* — Hong S Cho
(74) *Attorney, Agent, or Firm* — Lee, Hong, Degerman, Kang & Waimey

(57) ABSTRACT

A method for a terminal to receive system information via a beam in a wireless communication system, and a device supporting the method are provided. The method may comprise: a step of receiving, via a beam, a message including scheduling information for system information, wherein the scheduling information includes information on a time window in which the system information is scheduled; and a step of receiving the system information in the time window via the beam.

13 Claims, 11 Drawing Sheets

(51) Int. Cl.
    *H04W 72/04*     (2009.01)
    *H04W 72/02*     (2009.01)
    *H04W 48/16*     (2009.01)
    *H04W 24/10*     (2009.01)
    *H04B 7/06*     (2006.01)
    *H04B 7/0413*     (2017.01)
    *H04W 72/12*     (2009.01)

(52) U.S. Cl.
    CPC .......... *H04B 7/0695* (2013.01); *H04W 24/10* (2013.01); *H04W 48/08* (2013.01); *H04W 48/16* (2013.01); *H04W 72/02* (2013.01); *H04W 72/046* (2013.01); *H04W 72/1231* (2013.01)

(56) References Cited

U.S. PATENT DOCUMENTS

| | | | |
|---|---|---|---|
| 2011/0205952 A1* | 8/2011 | Gou | H04L 49/90 370/312 |
| 2013/0286960 A1* | 10/2013 | Li | H04W 72/042 370/329 |
| 2014/0112220 A1* | 4/2014 | Kwak | H04B 7/0695 370/294 |
| 2015/0085805 A1 | 3/2015 | Li et al. | |
| 2015/0181575 A1 | 6/2015 | Ng et al. | |
| 2016/0212737 A1* | 7/2016 | Jang | H04L 5/00 |
| 2017/0142652 A1* | 5/2017 | Liu | H04W 52/0206 |

\* cited by examiner

METHOD AND DEVICE FOR RECEIVING SYSTEM INFORMATION VIA BEAM

CROSS-REFERENCE TO RELATED APPLICATIONS

This application is the National Stage filing under 35 U.S.C. 371 of International Application No. PCT/KR2017/007541, filed on Jul. 14, 2017, which claims the benefit of U.S. Provisional Application No. 62/364,824, filed on Jul. 20, 2016, the contents of which are all hereby incorporated by reference herein in their entirety.

BACKGROUND OF THE INVENTION

Field of the Invention

The present invention relates to a wireless communication system, and more particularly, to a method in which a terminal receives system information through a beam, and an apparatus supporting the method.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beamforming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

Meanwhile, the super high frequency band is considered in the 5G communication system to accomplish the higher data rate, and the beamforming technique is discussed to decrease the propagation loss of the radio wave and increase the transmission distance in the super high frequency band. Accordingly, there is a need to newly propose a method of receiving system information through beamforming.

According to an embodiment, there is provided a method in which a user equipment (UE) receives system information through a beam in a wireless communication system. The method may include: receiving a message including scheduling information on system information through a beam, wherein the scheduling information includes information on a time window in which the system information is scheduled; and receiving the system information in the time window through the beam.

The message including the scheduling information on the system information may be received through each of multiple beams. The scheduling information on the system information may differ for the multiple beams.

The method may further include measuring quality of multiple beams transmitted by a base station (BS). The method may further include selecting the beam from among the multiple beams on the basis of the measured quality of the beams. The system information may be received through the selected beam in the time window. The selected beam may be a beam of which measured quality is the best quality among the multiple beams transmitted by the BS. Alternatively, the selected beam may be a beam of which measured quality is greater than or equal to a predefined threshold among the multiple beams transmitted by the BS. The selected beam may be plural in number.

The message may further include update information on the system information. The update information may indicate an update state of the system information. The update state of the system information may be indicated by a value tag.

The message may be at least any one of a master information block (MIB) and a system information block1 (SIB1).

The message may be a physical downlink control channel (PDCCH).

A time window in which the system information is scheduled may be defined on a beam basis.

A time window in which the system information is scheduled may be defined for a set of multiple beams.

There is provided a UE for receiving system information through a beam in a wireless communication system. The UE may include: a memory; a transceiver; and a processor for coupling the memory and the transceiver. The processor may be configured to: control the transceiver to receive a message including scheduling information on system information through a beam, wherein the scheduling information includes information on a time window in which the system information is scheduled; and control the transceiver to receive the system information in the time window through the beam.

System information can be effectively received based on beamforming.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
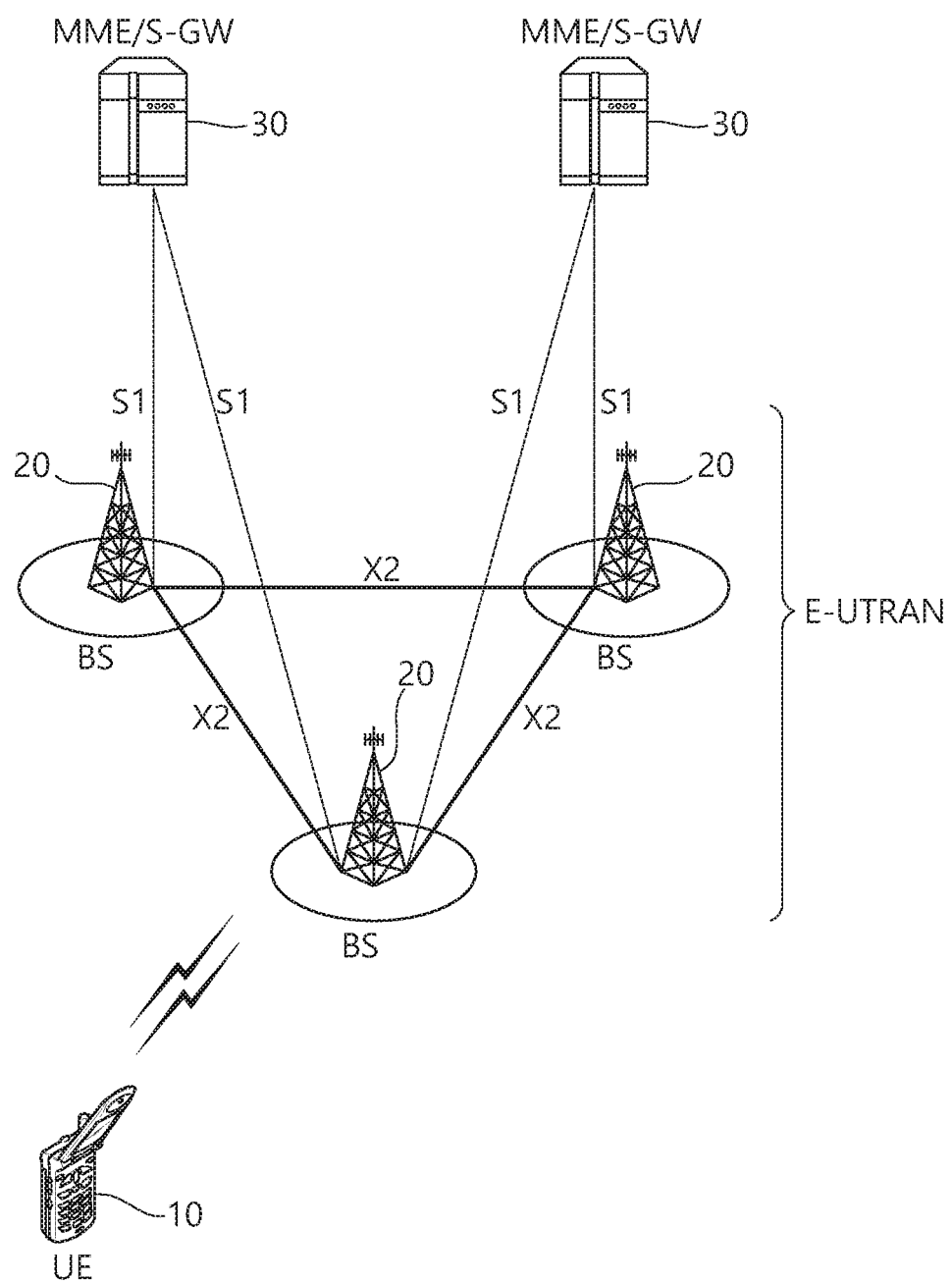
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc.

One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
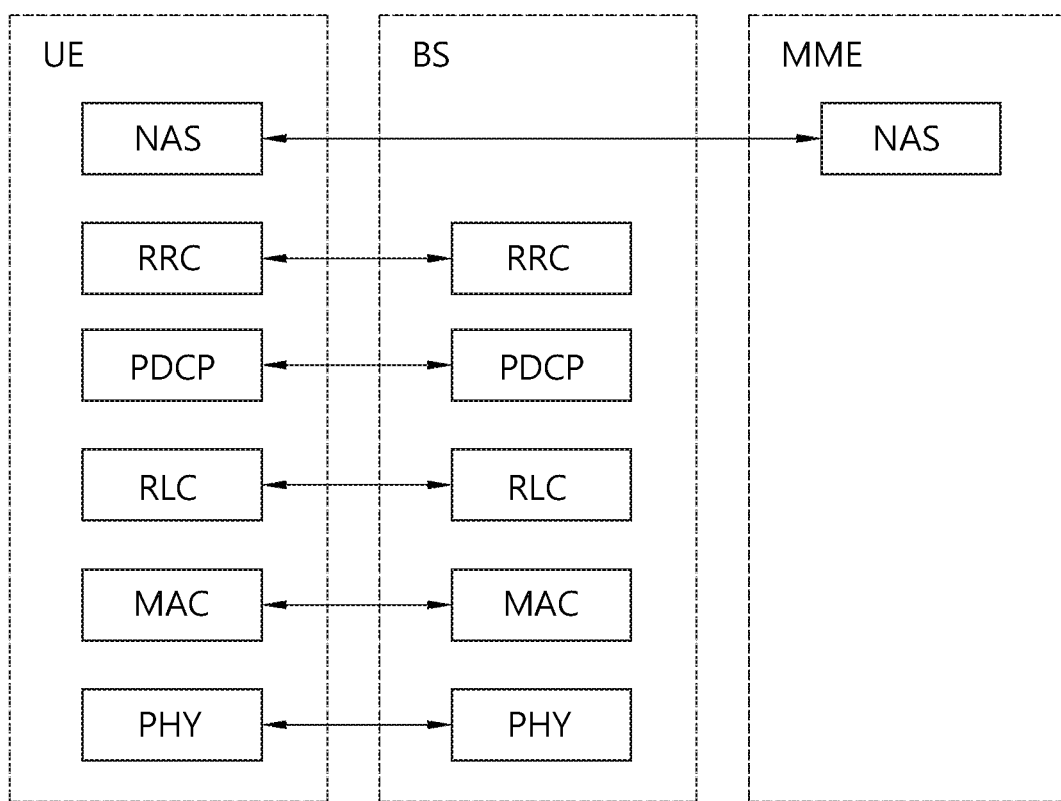
FIG. 2 shows a control plane of a radio interface protocol of an LTE system.
Figure 3:
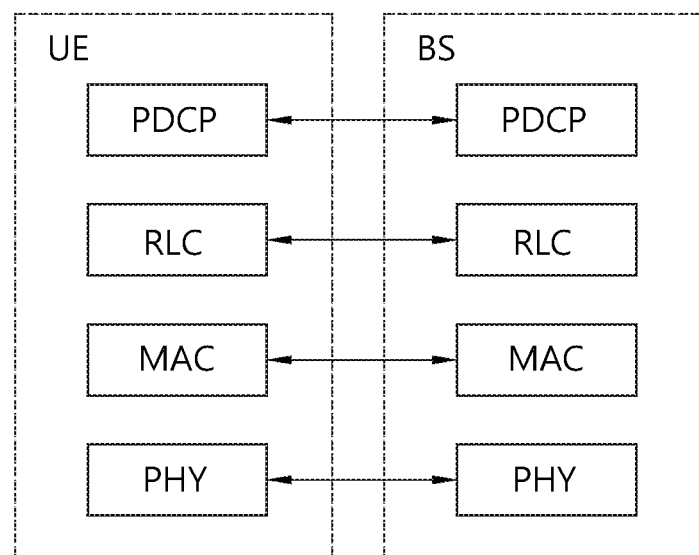
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
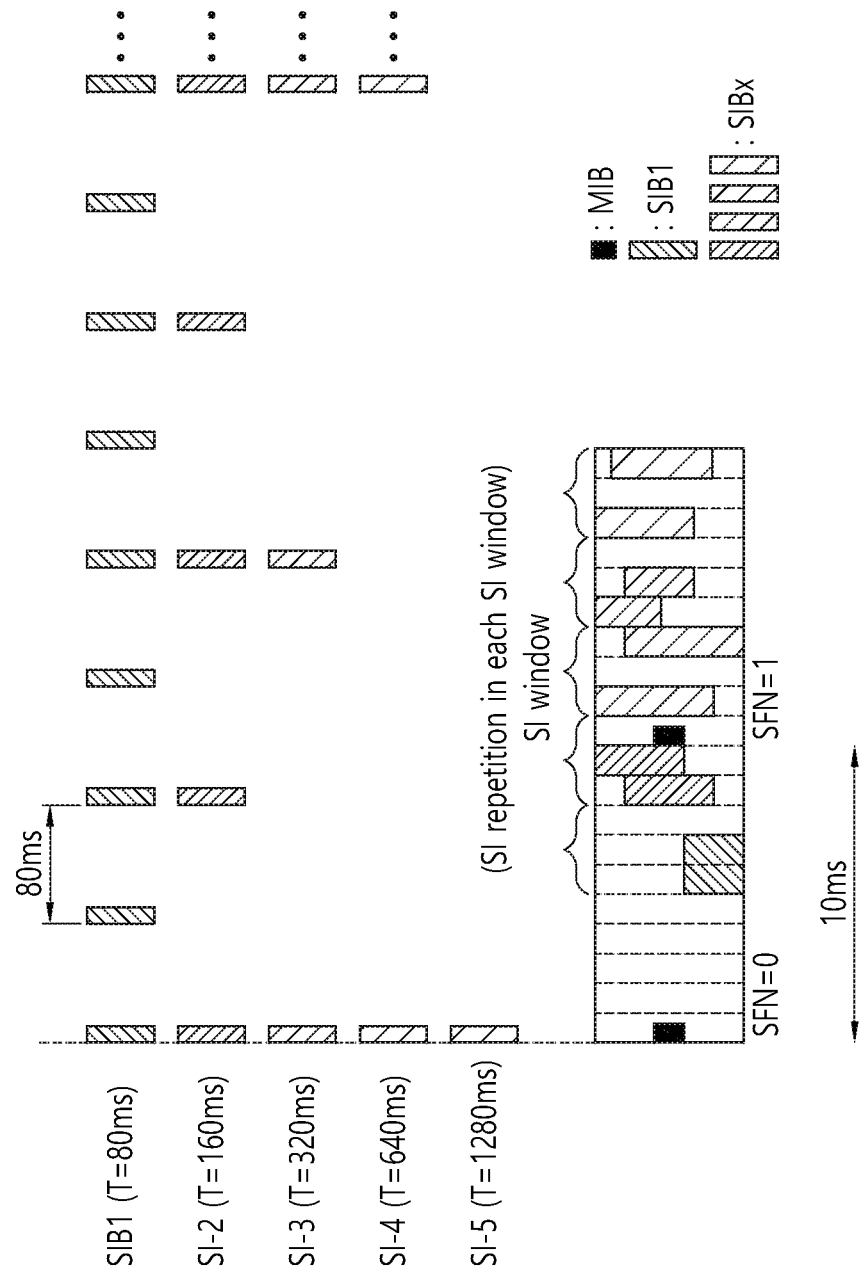
FIG. 4 shows an example of transmitting a master information block (MIB), system information block1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9.3.0," which is described in detail.

Figure 5:
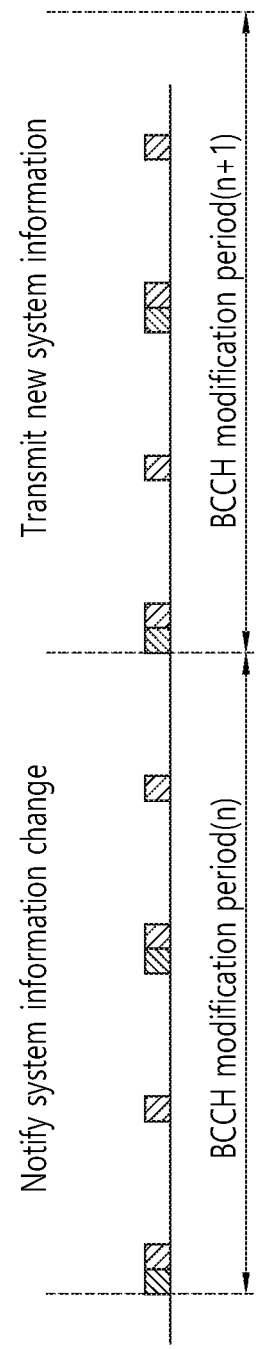
FIG. 5 shows an update of system information.

FIG. 5 shows an update of system information.

Referring to FIG. 5, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, Beamforming Will be Described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 6:
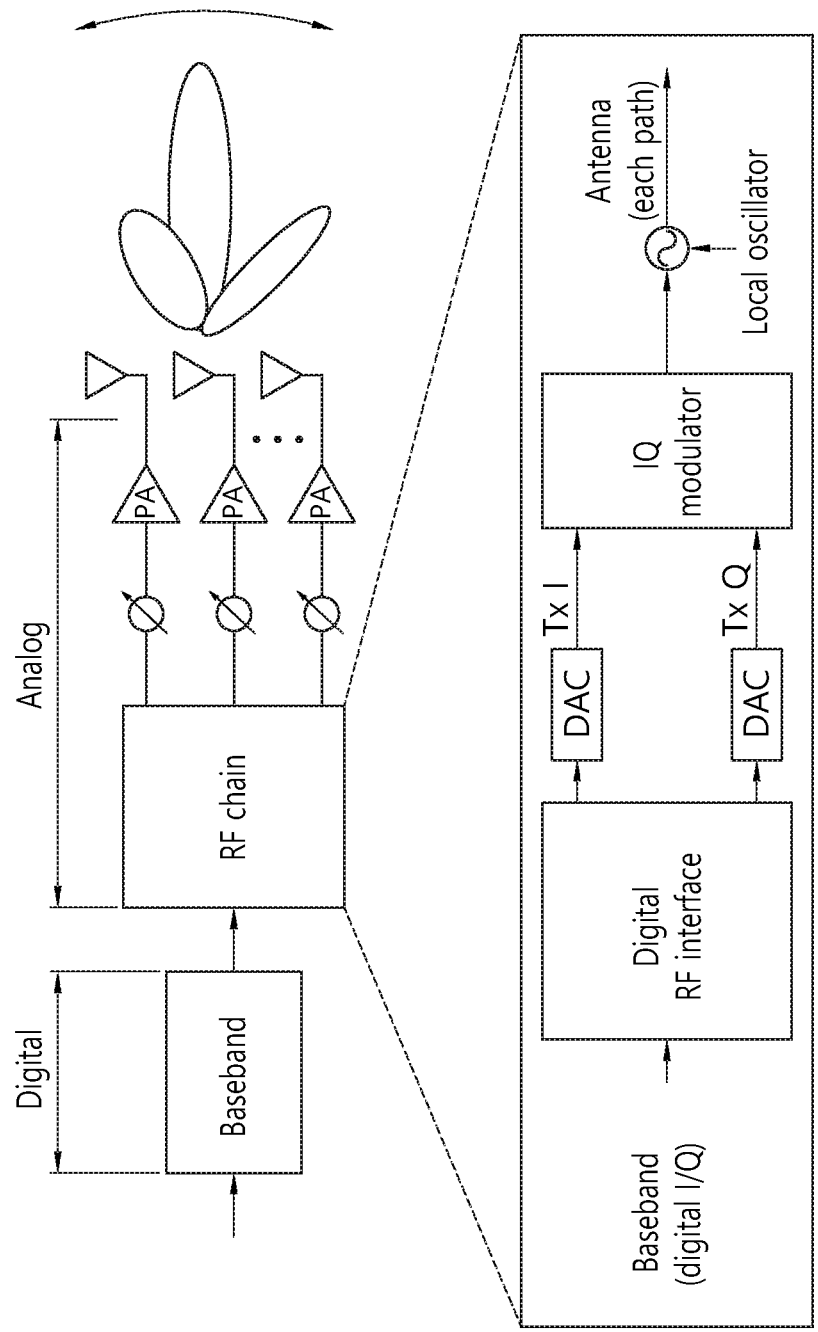
FIG. 6 shows an example of an analog beamforming.

FIG. 6 shows an example of an analog beamforming.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 7:
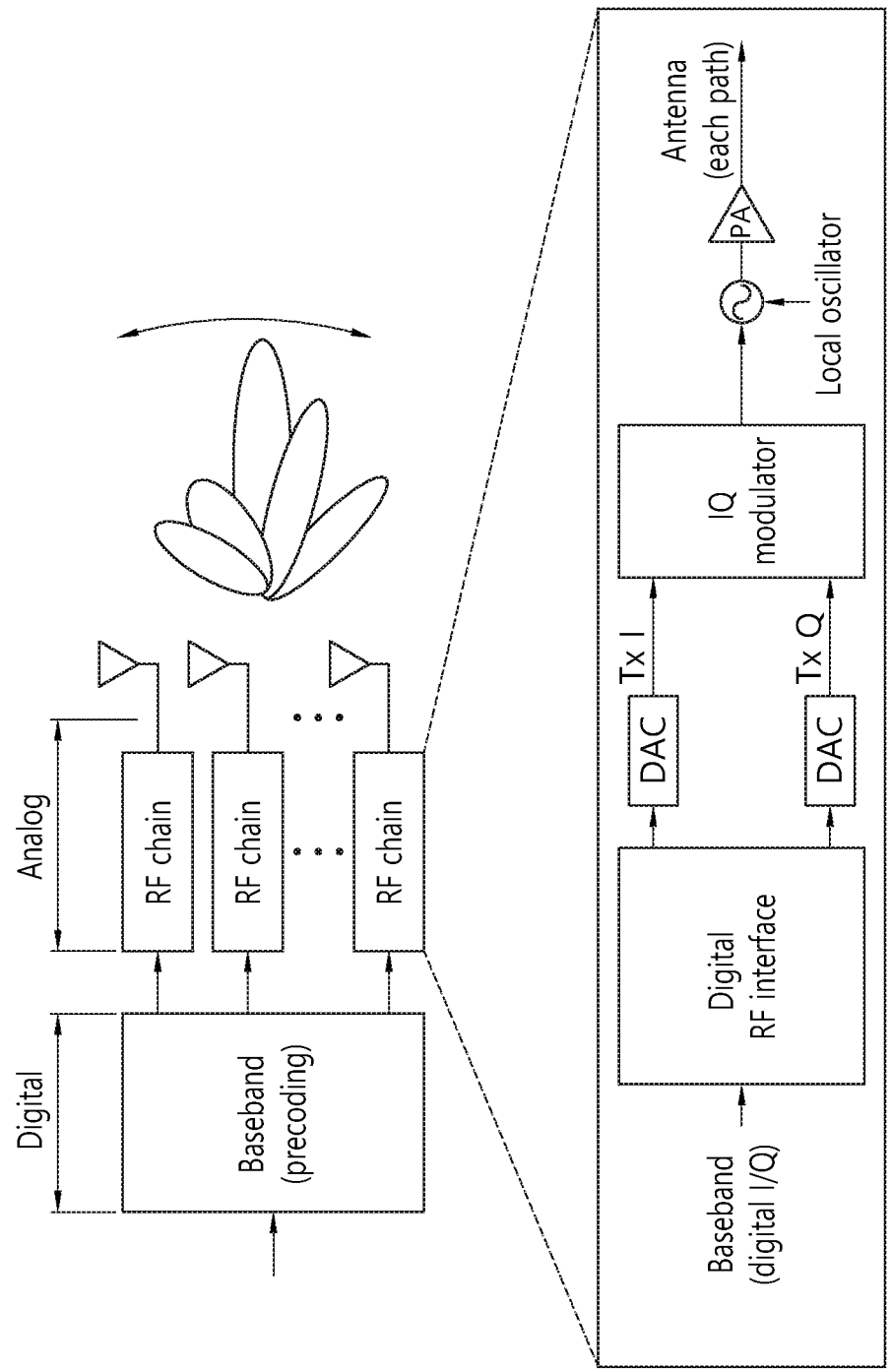
FIG. 7 shows an example of a digital beamforming.

FIG. 7 shows an example of a digital beamforming.

In digital beamforming, as opposed to analog beamforming, a beam is formed in the digital stage by a baseband process, in order to maximize diversity and multiplexing gain in an MIMO environment. Referring to FIG. 7, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 8:
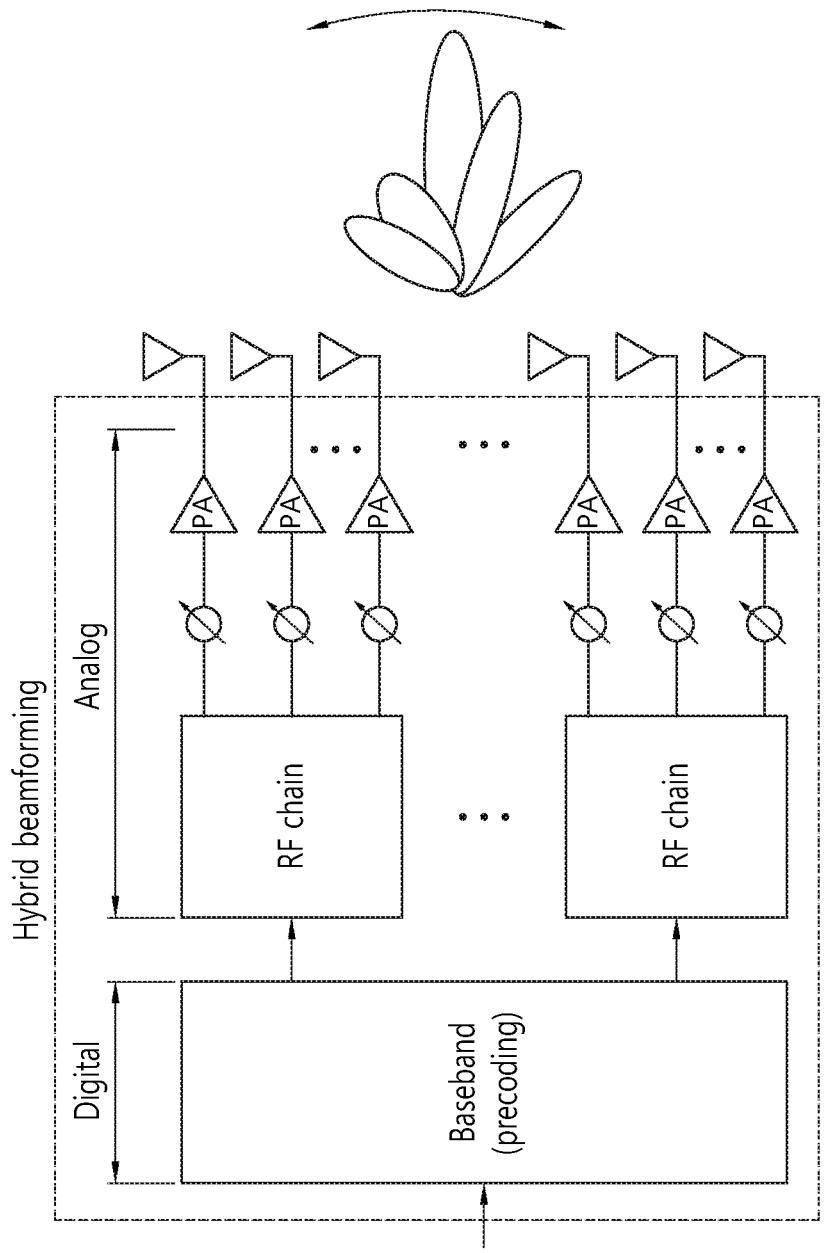
FIG. 8 shows an example of the hybrid beamforming.

FIG. 8 shows an example of the hybrid beamforming.

As described above, the hybrid beamforming is aimed at configuring a transmitting end capable of taking advantage of the advantages of analog beamforming and digital beamforming in a large MIMO environment. Referring to FIG. 8, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

Meanwhile, in order to effectively receive system information, a UE may need to receive specific system information on the basis of beamforming. Hereinafter, a method of receiving system information on the basis of beamforming and an apparatus supporting the method will be described according to an embodiment of the present invention.

According to an embodiment of the present invention, an MIB, SIB type A, or PDCCH may be transmitted on a beam #N. The MIB, SIB type A, or PDCCH which is transmitted on the beam #N may indicate scheduling information and/or update information subsequently transmitted on the beam #N. N may be the maximum number of beams at a BS, a cell, or a TRP. The subsequent transmission may include transmission of a specific system information message through a PDSCH. The specific system information message may include SIB type B. Alternatively, the subsequent transmission may include transmission of an MAC PDU through the PDSCH. The MAC PDU may include a user packet.

For example, the MIB which is transmitted on a beam #2 may include scheduling information and/or update information of SIB type B subsequently transmitted on the beam #2. For example, the SIB type A which is transmitted on a beam #4 may include scheduling information and/or update information of SIB type B subsequently transmitted on the beam #4. For example, the PDCCH which is transmitted on a beam #3 may include scheduling information and/or update information of SIB type B subsequently transmitted on the beam #3.

Figure 9:
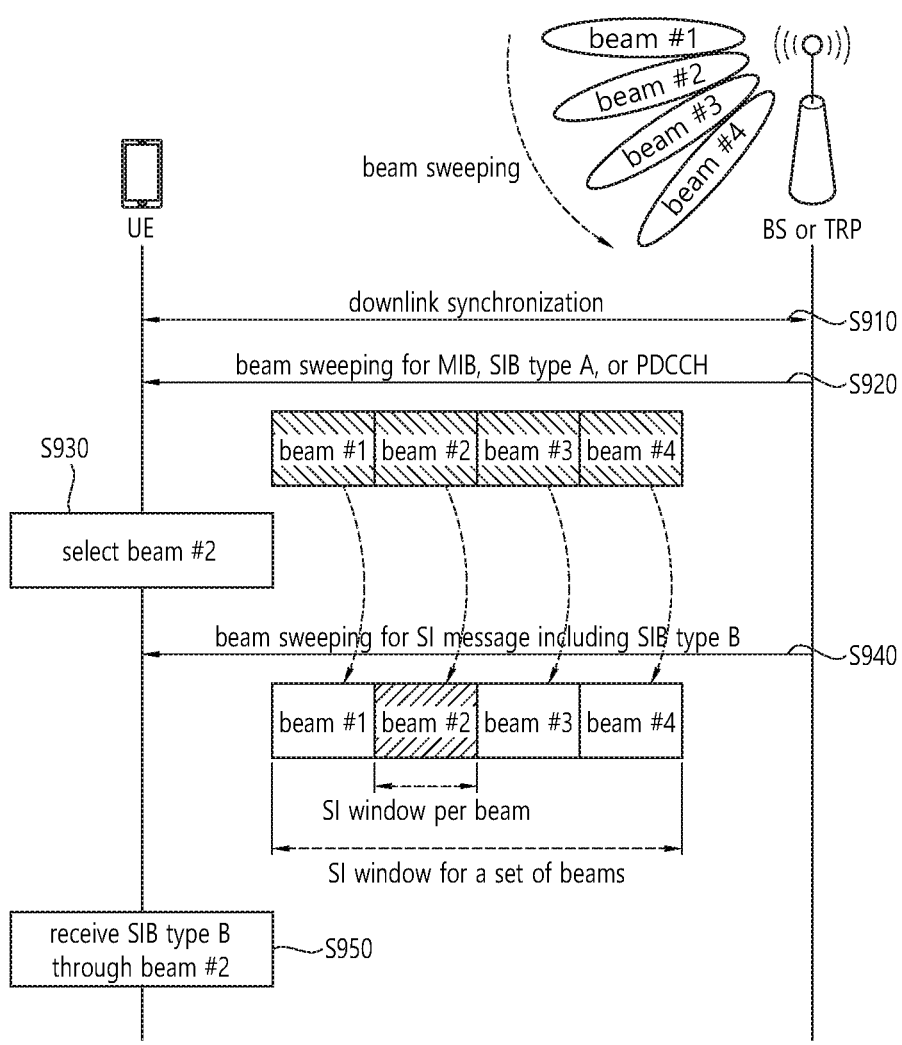
FIG. 9 shows a procedure of receiving system information on the basis of beamforming according to an embodiment of the present invention.

FIG. 9 shows a procedure of receiving system information on the basis of beamforming according to an embodiment of the present invention.

Referring to FIG. 9, a BS may perform beam sweeping. Although it is assumed in the embodiment of FIG. 9 that the BS sweeps a beam #1 to a beam #4, this only implies that the BS can sweep multiple beams, and the number of beams to be swept is not limited by the embodiment of FIG. 9. The BS may be referred to as a transmission reception point (TRP).

In step S910, the UE may perform downlink synchronization to the TRP or a cell of the BS.

In step S920, the BS may transmit multiple beams in a beam sweeping duration. The beam sweeping duration may imply a duration in which the BS entirely or partially sweeps an antenna beam of the BS. The BS may broadcast a PDCCH or a first information block by using multiple beams. Different beams may be transmitted at different time intervals. For example, the different beams may be transmitted in different symbols or different subframes possibly with a beam interference signal (BRS). The first information block or the PDCCH may be transmitted repeatedly through different beams. The first information block may correspond to either MIB or SIB type A. For example, the SIB type A may be SIB1. For example, the SIB type A may be SIB1 and SIB2.

The MIB, SIB type A, or PDCCH which is transmitted on a beam #N may indicate scheduling information on a specific SI message which is transmitted on the beam #N. The specific SI message may include the SIB type B. For example, the SIB type B may be one or more SIBs excluding the SIB1. For example, the SIB type B may be one or more SIBs excluding the SIB1 and the SIB2. The scheduling information which is transmitted on the beam may include at least any one of information related to scheduling of the SI message and information related to an update of the SI message.

Information related to scheduling of an SI message: The information related to the scheduling of the SI message may indicate when the SI message will be scheduled. For example, the information related to the scheduling of the SI message may indicate a window in which the SI message can be scheduled for a corresponding beam. In the embodiment of FIG. 9, an MIB, SIB type A, or PDCCH which is transmitted on a beam #1 may include scheduling information on a specific SI message transmitted on the beam #1, and the scheduling information may indicate a window in which the specific SI message is scheduled on the beam #1. Likewise, an MIB, SIB type A, or PDCCH which is transmitted on a beam #2 may include scheduling information on a specific SI message transmitted on the beam #2, and the scheduling information may indicate a window in which the specific SI message is scheduled on the beam #2.

Information related to an update of an SI message: The information related to the update of the SI message may indicate an update state of the SI message. For example, the information related to the update of the SI message may be a value tag. The information related to the update of the SI message may indicate an update state of the SI message for a corresponding beam. In the embodiment of FIG. 9, an MIB, SIB type A, or PDCCH which is transmitted on a beam #1 may include scheduling information on a specific SI message transmitted on the beam #1, and the scheduling information may indicate whether the specific SI message is updated on the beam #1. Likewise, an MIB, SIB type A, or PDCCH which is transmitted on a beam #2 may include scheduling information on a specific SI message transmitted on the beam #2, and the scheduling information may indicate whether the specific SI message is updated on the beam #2.

The PDCCH may be addressed by RNTI. For example, the RNTI may be SI-RNTI. The PDCCH may be repeatedly transmitted through different beams. The RNTI may be allocated on a beam basis. For example, RNTI #1 may be mapped to the beam #1, RNTI #2 may be mapped to the beam #2, and RNTI #N may be mapped to a beam #N. The PDCCH addressed by the RNTI #N may indicate transmission of the SI message through the beam #N.

Alternatively, if a PDCCH addressed by RNTI is transmitted through a beam #I, DCI in the PDCCH may indicate the beam #I. If the UE selects the beam #I, the UE may receive the SI message on a PDSCH through the beam #I according to the PDCCH. The PDCCH may be addressed by RNTI #I. Alternatively, the PDCCH may indicate the beam #I.

In step S930, the UE may measure quality of each beam by receiving different beams at different time intervals. In addition, the UE may select a beam on the basis of the measured quality of the beam. The UE may select a beam which provides the highest measurement quality from among all beams. Alternatively, the UE may select one or more beams of which measured quality is greater than or equal to a threshold. In the embodiment of FIG. 9, it is assumed that the UE has selected the beam #2 on the basis of the measure quality of the beam.

In step S940, the UE may know when the SI message is transmitted with the selected beam within the SI window in step S920. That is, the UE may know the SI window in which the SI message is transmitted on a specific beam on the basis of the MIB, SIB Type A, or PDCCH transmitted on the specific beam. Therefore, the UE which has selected the specific beam in step S930 may select an SI window corresponding to the specific beam to receive the SI message. For example, a UE which has selected the beam #2 may know that the SI message will be transmitted within a specific SI window, and may select the specific SI window.

The SI window may be defined per beam. Alternatively, the SI window may be defined for a set of beams or all beams at a cell.

Option 1: The SI window in which an SI message can be transmitted may be defined per beam. The UE may select the SI window in which the selected beam can be scheduled. If the UE has selected multiple beams, the UE may select multiple SI windows. The UE may monitor a PDCCH within the selected SI window to receive the SI message. In the embodiment of FIG. 9, the SI window may be defined for each of the beam #1, the beam #2, the beam #3, and the beam #4. A UE which has selected the second beam may select an SI window defined for the second beam, and may monitor the PDCCH within the selected SI window.

Option 2: The SI window in which the SI message can be scheduled may be defined for a set of beams or all beams at a cell. The UE may select a beam interval in which the selected beam can be scheduled. If the UE has selected multiple beams, the UE may select multiple beam intervals. The UE may monitor a PDCCH within the selected beam interval to receive the SI message. In the embodiment of FIG. 9, only one SI window may be defined for the beam #1 to the beam #4. A UE which has selected the beam #2 may select a beam interval corresponding to the second beam, and may monitor a PDCCH within the selected beam interval.

In step S950, the UE may receive system information on a PDSCH from the selected beam within the selected SI window. The UE may receive PDSCH transmission across multiple SI windows and combine multiple transmissions to acquire the system information.

Figure 10:
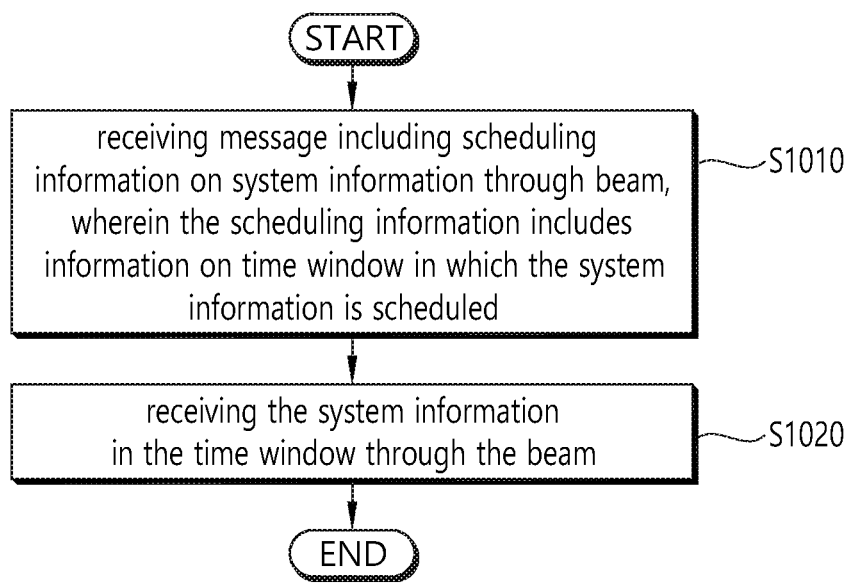
FIG. 10 is a block diagram showing a method in which a user equipment (UE) receives system information through a beam according to an embodiment of the present invention.

FIG. 10 is a block diagram showing a method in which a UE receives system information through a beam according to an embodiment of the present invention.

Referring to FIG. 10, in step S1010, the UE may receive a message including scheduling information on system information through a beam. The scheduling information may include information on a time window in which the system information is scheduled.

The message including the scheduling information on the system information may be received through each of multiple beams. The scheduling information on the system information may differ for the multiple beams.

The message may further include update information on the system information. The update information may indicate an update state of the system information. The update state of the system information may be indicated by a value tag.

The message may be at least any one of a master information block (MIB) and a system information block 1 (SIB1). The message may be a physical downlink control channel (PDCCH).

A time window in which the system information is scheduled may be defined on a beam basis. Alternatively, a time window in which the system information is scheduled may be defined for a set of multiple beams.

In step S1020, the UE may receive the system information in the time window through the beam.

Alternatively, the UE may measure quality of multiple beams transmitted by a BS. In addition, the UE may select the beam from among the multiple beams on the basis of the measured quality of the beams. The system information may be received through the selected beam in the time window.

The selected beam may be a beam of which measured quality is the best quality among the multiple beams transmitted by the BS.

Alternatively, the selected beam may be a beam of which measured quality is greater than or equal to a predefined threshold among the multiple beams transmitted by the BS. In this case, the selected beam may be plural in number.

Figure 11:
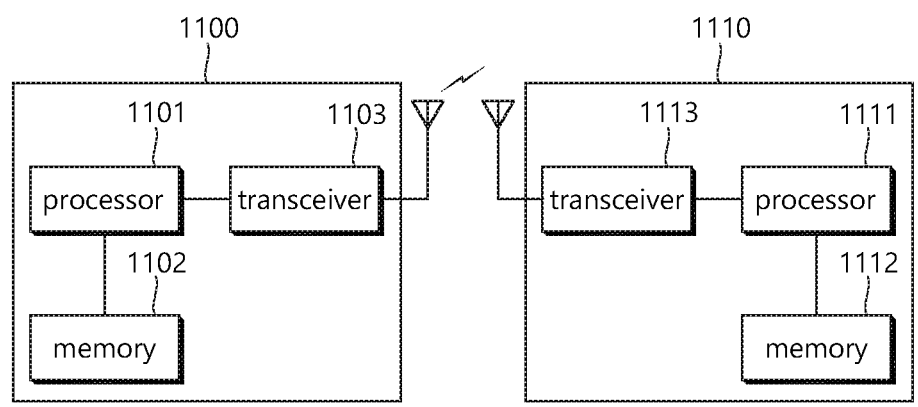
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method in which a user equipment (UE) receives system information through a beam in a wireless communication system, the method comprising:
   receiving a message comprising scheduling information on system information through each of multiple beams, wherein the scheduling information comprises information on a time window in which the system information is scheduled; and
   receiving the system information in the time window through the beam,
   wherein the scheduling information on the system information differs for the multiple beams.

2. The method of claim 1, further comprising measuring quality of the multiple beams transmitted by a base station (BS).

3. The method of claim 2, further comprising selecting the beam from among the multiple beams on the basis of the measured quality of the beams, wherein the system information is received through the selected beam in the time window.

4. The method of claim 3, wherein the selected beam is a beam of which measured quality is the best quality among the multiple beams transmitted by the BS.

5. The method of claim 3, wherein the selected beam is a beam of which measured quality is greater than or equal to a predefined threshold among the multiple beams transmitted by the BS.

6. The method of claim 5, wherein the selected beam is plural in number.

7. The method of claim 1, wherein the message further comprises update information on the system information, wherein the update information indicates an update state of the system information.

8. The method of claim 7, wherein the update state of the system information is indicated by a value tag.

9. The method of claim 1, wherein the message is at least any one of a master information block (MIB) or a system information block 1 (SIB1).

10. The method of claim 1, wherein the message is a physical downlink control channel (PDCCH).

11. The method of claim 1, wherein the time window in which the system information is scheduled is defined on a beam basis.

12. The method of claim 1, wherein the time window in which the system information is scheduled is defined for a set of the multiple beams.

13. A user equipment (UE) for receiving system information through a beam in a wireless communication system, the UE comprising:
   a memory;
   a transceiver; and
   a processor for coupling the memory and the transceiver, wherein the processor is configured to:
   control the transceiver to receive a message comprising scheduling information on system information through each of multiple beams, wherein the scheduling information comprises information on a time window in which the system information is scheduled; and
   control the transceiver to receive the system information in the time window through the beam,
   wherein the scheduling information on the system information differs for the multiple beams.

* * * * *